(12) United States Patent
Amemiya

(10) Patent No.: US 6,752,761 B2
(45) Date of Patent: Jun. 22, 2004

(54) ULTRASONIC DIAGNOSTIC APPARATUS AND POWER SUPPLY APPARATUS

(75) Inventor: Shinichi Amemiya, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 10/116,476

(22) Filed: Apr. 4, 2002

(65) Prior Publication Data
US 2002/0165452 A1 Nov. 7, 2002

(30) Foreign Application Priority Data
May 4, 2001 (JP) ........................................ 2001-107776

(51) Int. Cl.[7] .............................................. A61B 8/00
(52) U.S. Cl. ...................................................... 600/437
(58) Field of Search ................................ 600/407–471; 73/605–635, 596; 367/7, 11, 130, 138, 140, 87, 153, 155; 128/916; 310/311; 340/870.3; 334/80

(56) References Cited

U.S. PATENT DOCUMENTS

| 4,092,867 | A | * | 6/1978 | Matzuk | 73/609 |
|---|---|---|---|---|---|
| 4,872,145 | A | * | 10/1989 | Culbert et al. | 367/87 |
| 5,509,413 | A | | 4/1996 | Akama et al. | |
| 5,542,425 | A | | 8/1996 | Marshall et al. | |
| 5,610,509 | A | | 3/1997 | Nustad | |
| 5,640,960 | A | * | 6/1997 | Jones et al. | 600/453 |
| 5,928,169 | A | | 7/1999 | Schatzle et al. | |
| 6,375,619 | B1 | | 4/2002 | Ohdachi | |
| 6,398,734 | B1 | | 6/2002 | Cimochowski et al. | |
| 6,499,348 | B1 | * | 12/2002 | Mamayek | 73/632 |

* cited by examiner

Primary Examiner—Ali Imam
(74) Attorney, Agent, or Firm—Carl B. Horton, Esq.; Armstrong Teasdale LLP

(57) ABSTRACT

In order to reduce the number of components to achieve size reduction of an ultrasonic diagnostic apparatus, the ultrasonic diagnostic apparatus 101 is provided with a power supply section 3 comprised of a bias power supply 4 for generating a bias voltage and a driving power supply 5 for generating a driving voltage using the bias voltage. The bias voltage is higher than the driving voltage. Since the driving power supply 5 merely generates a lower voltage based upon a higher voltage, it is simpler in configuration and smaller in size than the conventional type that independently generates the voltages.

25 Claims, 6 Drawing Sheets

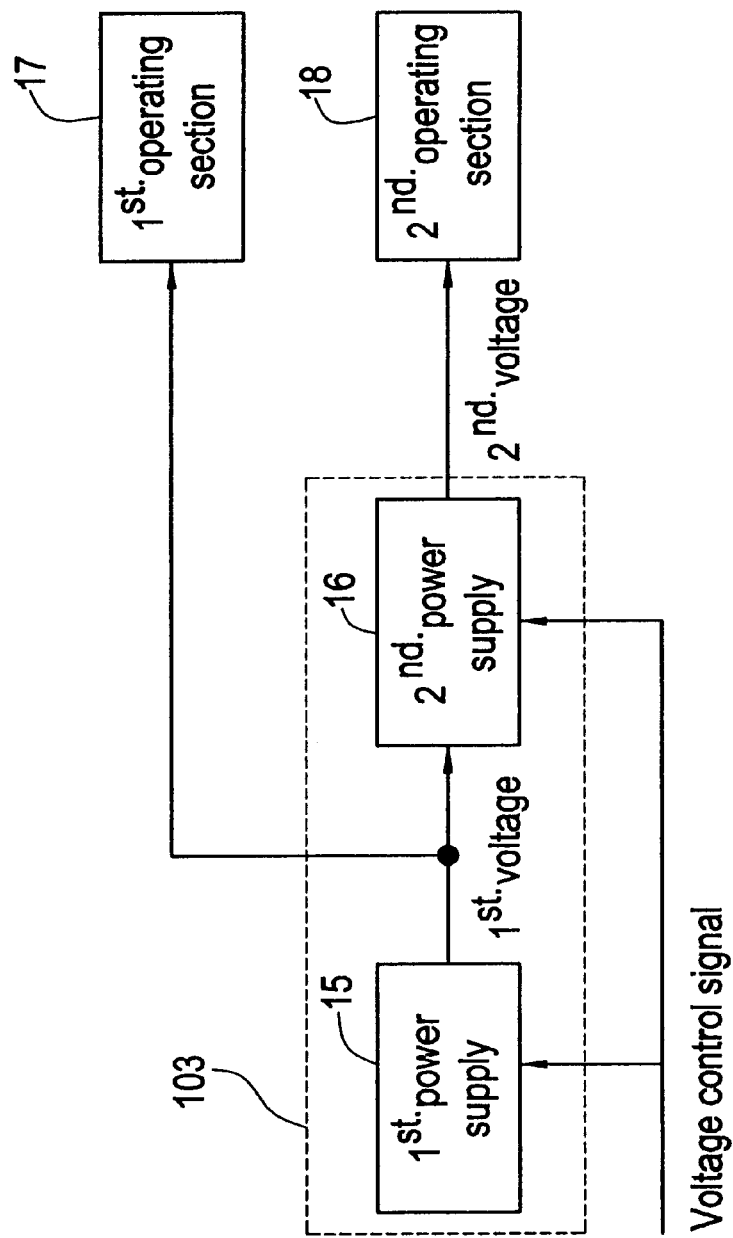

ULTRASONIC DIAGNOSTIC APPARATUS AND POWER SUPPLY APPARATUS

CROSS REFERENCE TO RELATED APPLICATIONS

This application claims the benefit of Japanese Application No. 2001-107776 filed April 5, 2001.

BACKGROUND OF THE INVENTION

The present invention relates to an ultrasonic diagnostic apparatus and power supply apparatus, and more particularly to an ultrasonic diagnostic apparatus and power supply apparatus having a reduced number of components.

Recently, ultrasonic diagnostic apparatuses have come into increasingly widespread use because of their small size, low cost and ease of use. As their use has spread, the call for further reduction in size and cost has intensified. However, the size of their power supply section precludes size reduction of the ultrasonic diagnostic apparatuses.

FIG. 1 shows a configuration of the main portion of a conventional ultrasonic diagnostic apparatus. The ultrasonic diagnostic apparatus 100 comprises: a driving section (also referred to as a driver) 1 for generating a driving signal based upon a trigger signal; an electronic switch (also referred to as a high voltage switch, analog switch or matrix switch) 2 for supplying the driving signal to a probe; a driving power supply 9 for generating a driving voltage needed to operate the driving section 1 and supplying the driving voltage to the driving section 1; and a bias power supply 10 for generating a bias voltage and supplying the bias voltage to the electronic switch 2.

Although not shown, a plurality of switches are provided in the electronic switch 2. Also although not shown, a plurality of piezoelectric elements are provided in the probe. The ultrasonic diagnostic apparatus carries out the ultrasonic scanning by performing switching operation of the plurality of switches in the electronic switch 2 based upon the bias voltage, and supplying the driving signal only to certain piezoelectric elements in the probe.

The driving power supply 9 generates the driving voltage based upon an alternating current input. The driving power supply 9 is a variable power supply, and generates a driving voltage of from +/−5 V to +/−70 V, for example. The amplitude of the driving voltage output from the driving power supply 9 is controlled based upon a predetermined voltage control signal. With regard to the driving voltage output from the driving power supply 9 in FIG. 1, P denotes the positive voltage, GND denotes the ground voltage, and N denotes the negative voltage.

The bias power supply 10 generates the bias voltage based upon an alternating current input. The bias power supply 10 is a fixed power supply, and generates a bias signal of +/−80 V, for example. With regard to the bias voltage output from the bias power supply 10 in FIG. 1, P denotes the positive voltage, GND denotes the ground voltage, and N denotes the negative voltage.

As described above, the driving power supply for independently generating the driving voltage needed to operate the driving section and the bias power supply for independently generating the bias voltage needed to control the electronic switch are separately provided in the conventional ultrasonic diagnostic apparatus. However, the separate provision of the driving power supply 9 and the bias power supply 10 in one and the same ultrasonic diagnostic apparatus increases the number of components because two power supplies of similar configuration are installed, making size reduction of the ultrasonic diagnostic apparatus more difficult.

SUMMARY OF THE INVENTION

The present invention was made in view of such a problem, and its object is to provide an ultrasonic diagnostic apparatus and power supply apparatus in which the number of components is reduced to achieve size reduction of the apparatus.

In order to attain the above object, an ultrasonic diagnostic apparatus of a first aspect of the invention has power supply means comprising: bias power supply means for generating a bias voltage; and driving power supply means using the bias voltage as an input to generate a driving voltage based upon the bias voltage.

According to this ultrasonic diagnostic apparatus, the bias power supply means generates a bias voltage, and the driving power supply means uses the bias voltage to generate a lower-voltage driving voltage. Since the driving power supply means merely generates a lower voltage based upon a higher voltage, it is simpler in configuration and smaller in size than the conventional type that independently generates the voltages.

In accordance with the ultrasonic diagnostic apparatus of a second aspect of the invention, the voltages generated by the bias power supply means and the driving power supply means are variable.

In accordance with the ultrasonic diagnostic apparatus of a third aspect of the invention, the driving power supply means include a linear power supply.

Moreover, a power supply apparatus of a fourth aspect of the invention, which supplies first operating means operated by a first voltage with the first voltage, and supplies second operating means operated by a second voltage lower than the first voltage with the second voltage, comprises: first power supply means for generating the first voltage; and second power supply means using the first voltage as an input to generate the second voltage based upon the first voltage.

According to this power supply apparatus, the first power supply means generates a first voltage, and second power supply means uses the first voltage to generate a lower-voltage second voltage. Since the second power supply means merely generates a lower voltage based upon a higher voltage, it is simpler in configuration and smaller in size than the conventional type that independently generates the voltages.

In accordance with the power supply apparatus of a sixth aspect of the invention, the second power supply means include a linear power supply.

In accordance with the power supply apparatus of a sixth aspect of the invention, the second power supply means consists of a linear power supply.

As described above, in the ultrasonic diagnostic apparatus of the present invention, the bias power supply generates a bias voltage, and the driving power supply uses the bias voltage to generate a driving voltage. Since the driving power supply merely generates a lower voltage based upon a higher voltage, it is simpler in configuration and smaller in size than the conventional type that independently generates the voltages. As a result, the ultrasonic diagnostic apparatus can as a whole be reduced in size and cost. Moreover, because the number of components is reduced, the probability of component failure is reduced and the reliability of the entire ultrasonic diagnostic apparatus is improved.

According to the power supply apparatus of the present invention, the first power supply section generates a first voltage, and the second power supply section uses the first voltage to generate a second voltage. Since the second power supply section merely generates a lower voltage based upon a higher voltage, it is simpler in configuration and smaller in size than the conventional type that independently generates the voltages. As a result, the power supply apparatus can be reduced in size and cost.

Further objects and advantages of the present invention will be apparent from the following description of the preferred embodiments of the invention as illustrated in the accompanying drawings.

BRIEF DESCRIPTION OF THE DRAWINGS

FIG. 6 is a diagram showing a configuration of a power supply apparatus in accordance with Embodiment 3 of the present invention.

DETAILED DESCRIPTION OF THE INVENTION

Embodiments of the ultrasonic diagnostic apparatus and power supply apparatus in accordance with the present invention will now be described in detail with reference to the accompanying drawings.

Embodiment 1

Figure 1:
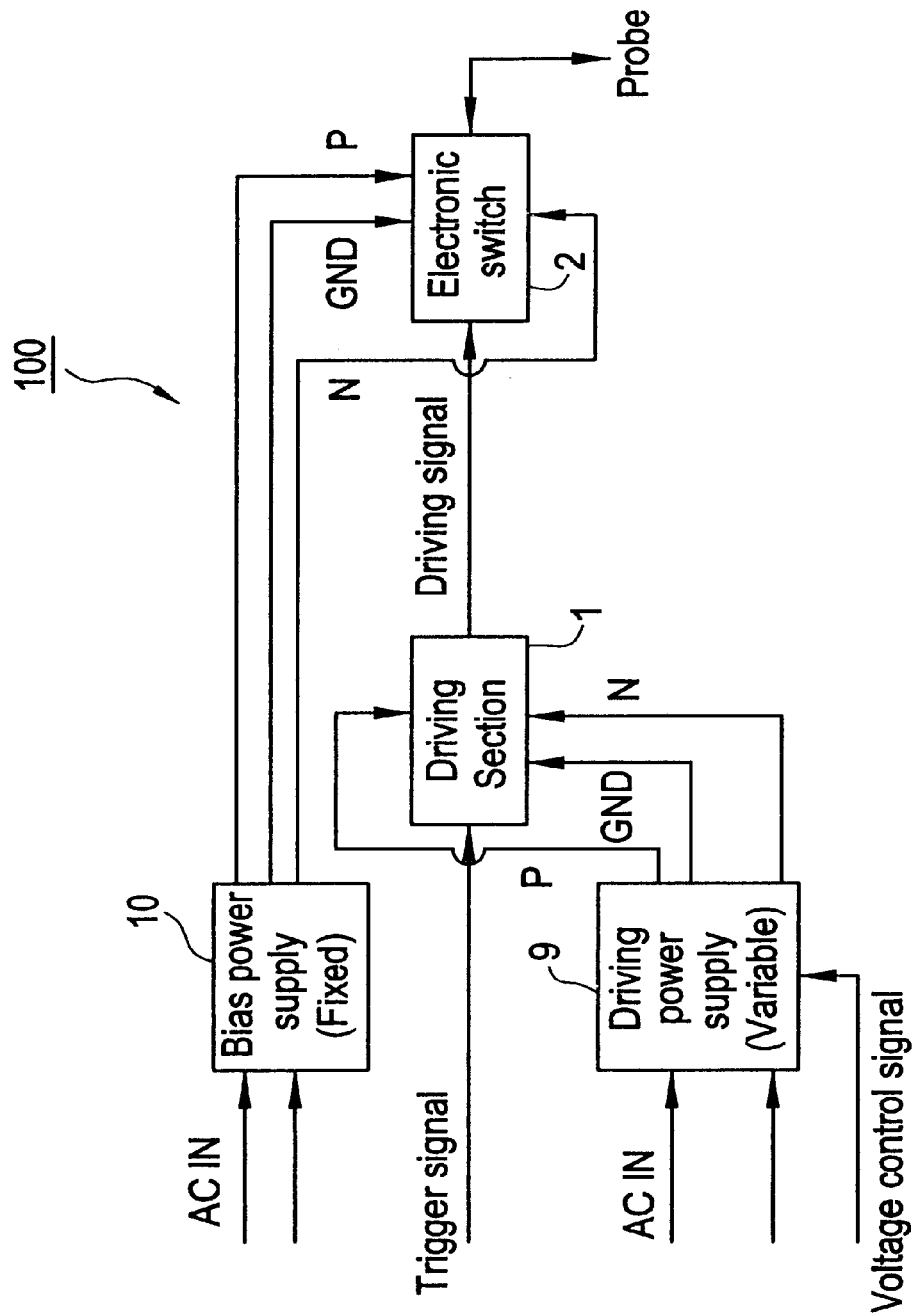
FIG. 1 is a diagram showing a configuration of a conventional ultrasonic diagnostic apparatus.
Figure 2:
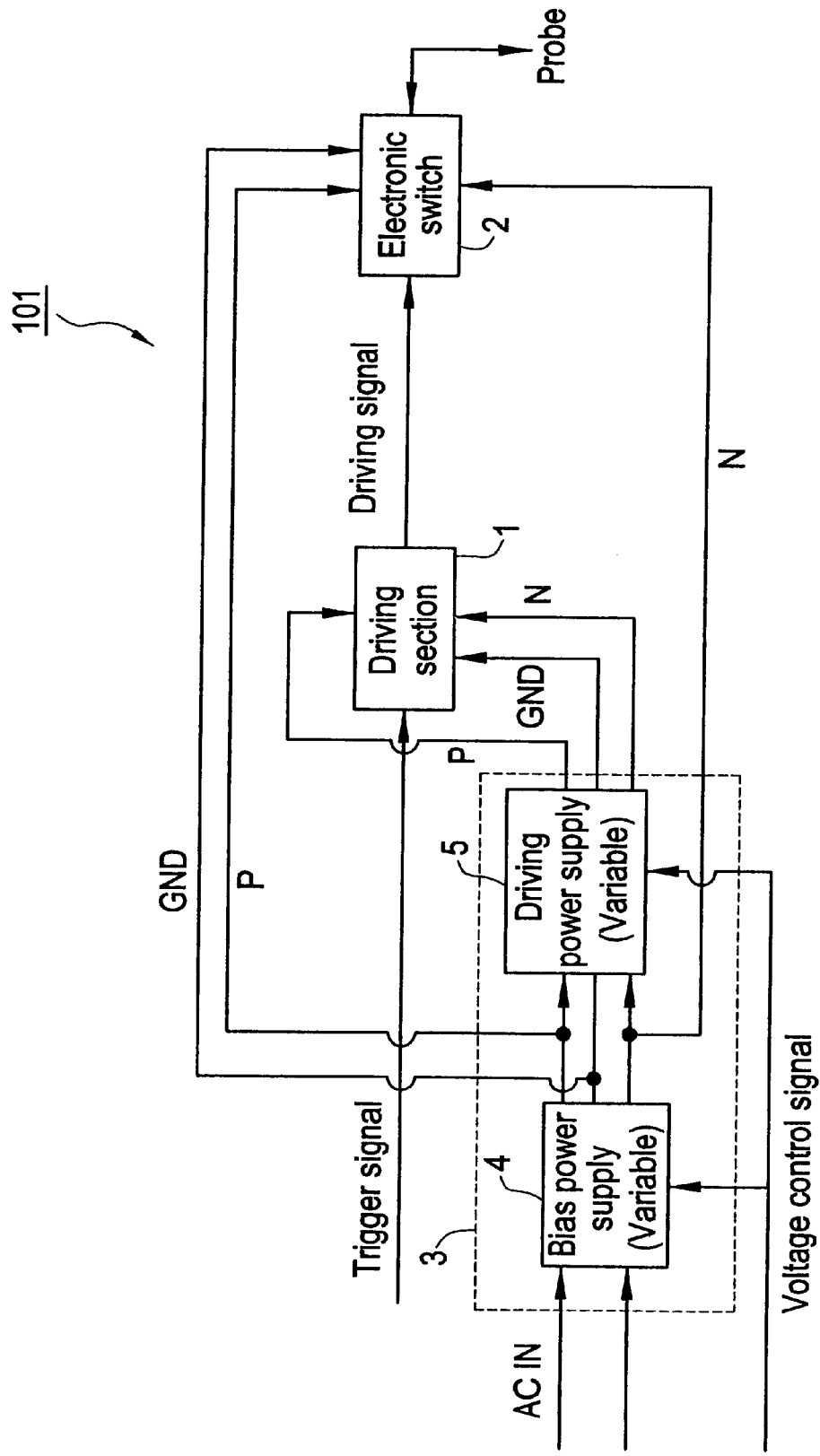
FIG. 2 is a diagram showing a configuration of the main portion of an ultrasonic diagnostic apparatus in accordance with Embodiment 1 of the present invention.

FIG. 2 shows a configuration of the main portion of an ultrasonic diagnostic apparatus in accordance with Embodiment 1 of the present invention. The ultrasonic diagnostic apparatus 101 comprises: a driving section 1 for generating a driving signal based upon a trigger signal; an electronic switch 2 for supplying the driving signal to a probe; a power supply section 3 for generating a driving voltage needed to operate the driving section 1 and supplying the driving voltage to the driving section 1, and for generating a bias voltage needed to control the electronic switch 2 and supplying the bias voltage to the electronic switch 2.

The power supply section 3 includes a bias power supply 4 for generating the bias voltage and a driving power supply 5 for generating the driving voltage. The bias power supply 4 generates the bias voltage based upon an alternating current input. The bias power supply 4 supplies the bias voltage to the electronic switch 2 and also inputs the bias voltage to the driving power supply 5. The bias power supply 4 is a variable power supply, and generates a bias voltage of from +/−5 V to +/−80 V, for example. The amplitude of the bias voltage output from the bias power supply 4 is controlled based upon a predetermined voltage control signal. With regard to the bias voltage output from the bias power supply 4 in FIG. 2, P denotes the positive voltage, GND denotes the ground voltage, and N denotes the negative voltage.

The driving power supply 5 generates the driving voltage based upon the bias voltage input by the bias power supply 4. The driving power supply 5 is a variable and linear power supply, and generates a driving signal of from +/−5 V to +/−70 V, for example. The amplitude of the driving voltage output from the driving power supply 5 is controlled based upon the voltage control signal. With regard to the driving voltage output from the driving power supply 5 in FIG. 2, P denotes the positive voltage, GND denotes the ground voltage, and N denotes the negative voltage.

Although not shown, a plurality of switches are provided in the electronic switch 2. Also although not shown, a plurality of piezoelectric elements are provided in the probe. The ultrasonic scanning is carried out by performing the switching operation of the plurality of switches in the electronic switch 2 based upon the bias voltage, and supplying the driving signal only to certain piezoelectric elements in the probe.

The bias voltage is higher than the driving voltage. The driving power supply 5 generates the lower-voltage driving voltage based upon the higher-voltage bias voltage input from the bias power supply 4. Therefore, the present apparatus is simpler in configuration and smaller in size than the configuration in which the driving voltage is independently generated.

The bias voltage does not affect the accuracy of the ultrasonic scanning even if it contains a certain amount of noise (ripple). On the other hand, if the driving voltage contains noise, the driving signal is affected by the noise and the accuracy of the ultrasonic scanning is degraded. Therefore, the driving power supply 5 preferably generates a driving voltage that has little noise and is stable. Accordingly, the difference between the noise removal ratios of the bias power supply 4 and the driving power supply 5 preferably is not less than 30 dB. Thus, a driving signal that has little noise and is stable can be generated.

Figure 3:
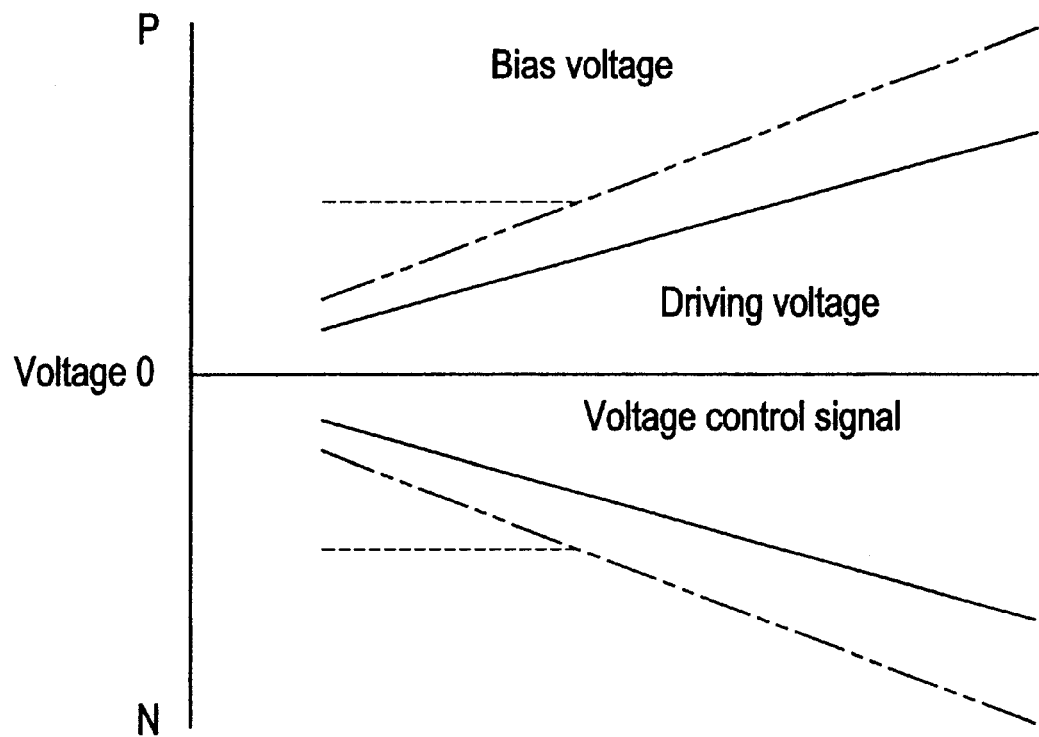
FIG. 3 is a graph showing the change in the amplitudes of the bias voltage and the driving voltage.

FIG. 3 is a graph showing the change in the amplitudes of the bias voltage and the driving voltage. The change in the amplitude of the bias voltage is indicated by a dot-dash line, and the change in the amplitude of the driving voltage is indicated by a solid line. Since the driving power supply 5 generates a driving voltage based upon a bias voltage, the bias voltage is maintained constantly higher than the driving voltage, as shown in FIG. 3. Additionally, the bias voltage maintained higher than the driving voltage can advantageously retain an overshoot voltage for ultrasound transmission. However, as the bias voltage falls, the ON resistance of the electronic switch 2 increases. In order to prevent the increase of the ON resistance, the bias voltage is preferably changed according to the dot line shown in FIG. 3 so that it is prevented from falling beyond a certain value.

As described above, according to the ultrasonic diagnostic apparatus 101 of Embodiment 1, the bias power supply 4 generates a bias voltage, and the driving power supply 5 uses the bias voltage to generate a driving voltage. Since the driving power supply 5 merely generates a lower voltage based upon a higher voltage, it is simpler in configuration and smaller in size than the conventional type that independently generates the voltages. As a result, the ultrasonic diagnostic apparatus can as a whole be reduced in size and cost. Moreover, because the number of components is reduced, the probability of component failure is reduced and the reliability of the entire ultrasonic diagnostic apparatus is improved.

Embodiment 2

Figure 4:
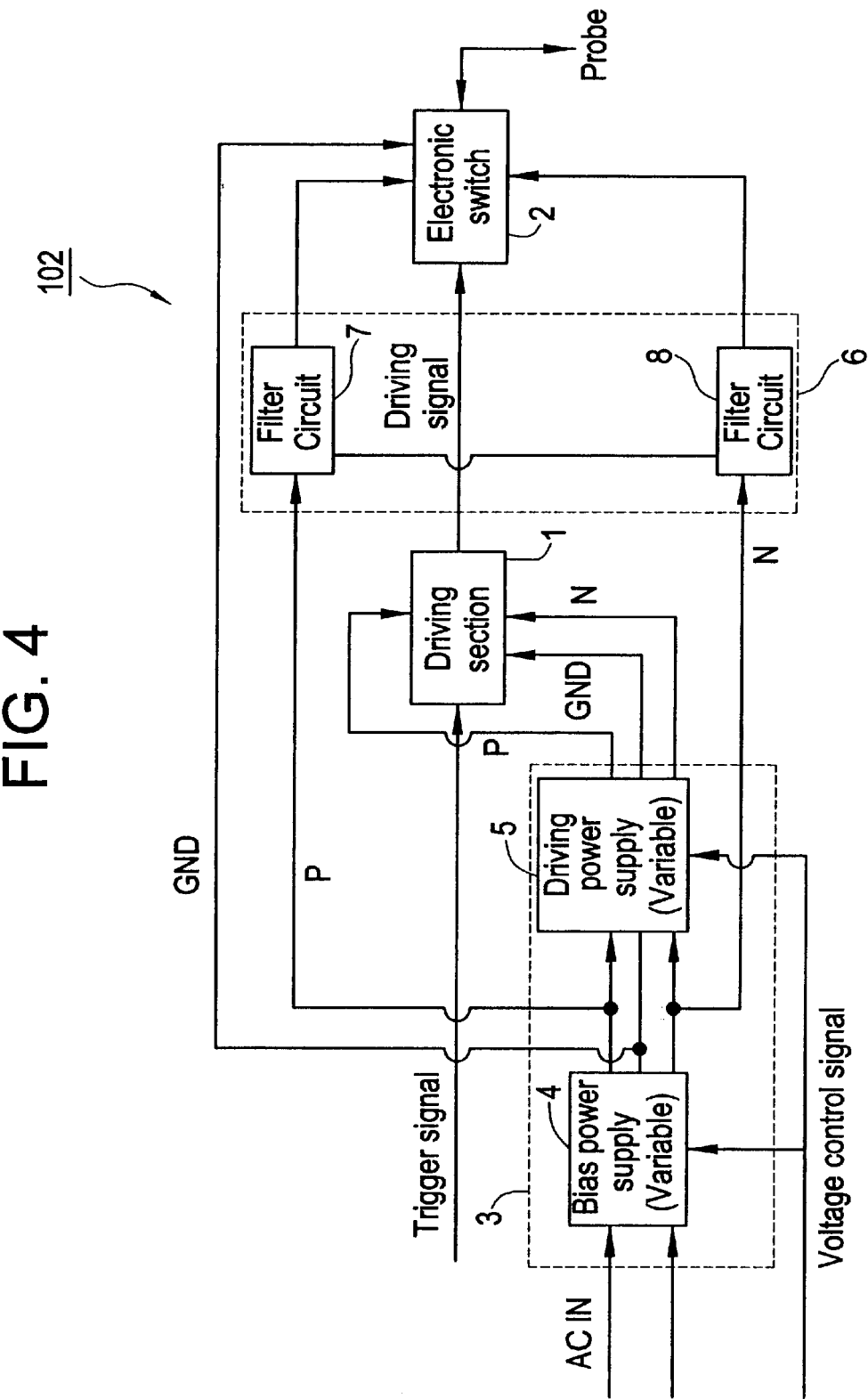
FIG. 4 is a diagram showing a configuration of the main portion of an ultrasonic diagnostic apparatus in accordance with Embodiment 2 of the present invention.

As described in Embodiment 1, the bias voltage is constantly higher than the driving voltage. Therefore, bias voltage noise may find its way into the driving voltage. In order to prevent this, an ultrasonic diagnostic apparatus 102 in accordance with Embodiment 2 of the present invention is provided with a filter section 6, as shown in FIG. 4. Since the configuration is similar to that of the ultrasonic diagnostic apparatus 101 shown in FIG. 2 except for the filter section 6, the configuration of the ultrasonic diagnostic apparatus 102 other than the filter section 6 will not be explained.

Figure 5:
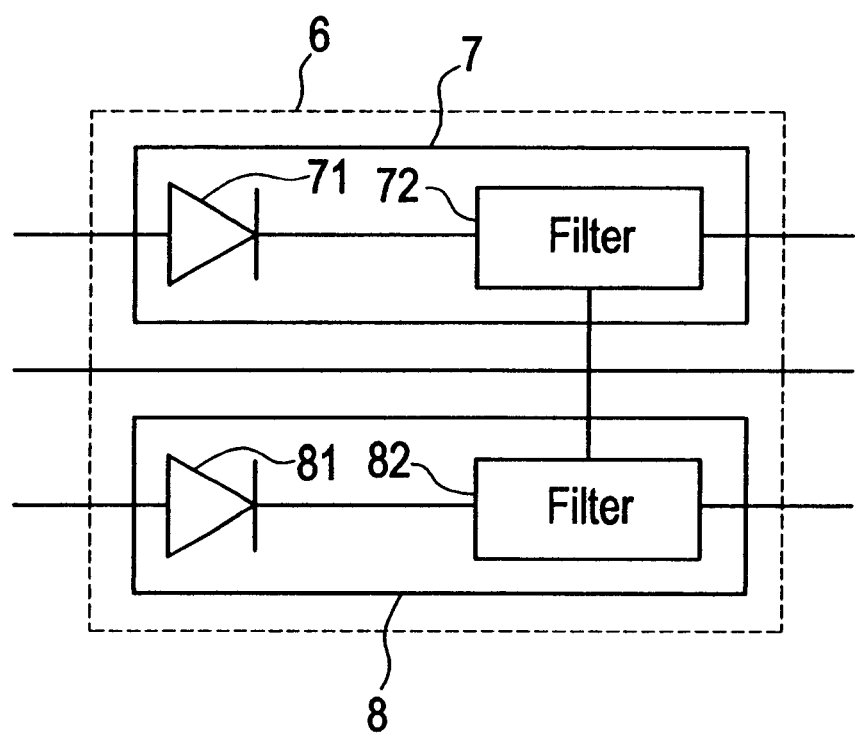
FIG. 5 is a diagram showing a configuration of a filter section of the ultrasonic diagnostic apparatus in accordance with Embodiment 2.

FIG. 5 shows a configuration of the filter section 6 in detail. The filter section 6 includes a filter circuit 7 provided in association with the positive bias voltage and a filter circuit 8 provided in association with the negative bias voltage. The filter circuit 7 includes a diode 71 and a filter 72. Similarly, the filter circuit 8 includes a diode 81 and a filter 82. By such a configuration, noise from the bias voltage is prevented from being included in the driving voltage.

As described above, the ultrasonic diagnostic apparatus 102 of Embodiment 2 provides the effect of preventing inclusion of noise from the bias voltage in the driving voltage, in addition to the effect obtained by the ultrasonic diagnostic apparatus 101 of Embodiment 1. As a result, the reliability of the entire ultrasonic diagnostic apparatus is improved.

Embodiment 3

The power supply apparatus 103 includes a first power supply section 15 and a second power supply section 16. The first power supply section 15 generates a first voltage, supplies the first voltage to a first operating section 17, and also inputs the first voltage to the second power supply section 16. The second power supply section 16 generates a second voltage based upon the first voltage, and supplies the second voltage to a second operating section 18. It should be noted that the first voltage is higher than the second voltage.

The power supply apparatus 103 consists of a first power supply section 15 and a second power supply section 16. The first power supply section 15 generates a first voltage, supplies the first voltage to a first operating section 17, and also inputs the first voltage to the second power supply section 16. The second power supply section 16 generates a second voltage based upon the first voltage, and supplies the second voltage to a second operating section 18. It should be noted that the first voltage is higher than the second voltage.

The voltages output from the first power supply section 15 and the second power supply section 16 are variable, and their amplitudes can be controlled based upon a predetermined voltage control signal. Moreover, the second power supply section 16 is a linear power supply.

The first operating section 17 is driven by the first voltage to perform a predefined first operation. Similarly, the second operating section 18 is driven by the second voltage to perform a predefined second operation.

As described above, according to the power supply apparatus 103 of Embodiment 3, the first power supply section 15 generates a first voltage, and the second power supply section 16 uses the first voltage to generate a second voltage. Since the second power supply section 16 merely generates a lower voltage based upon a higher voltage, it is simpler in configuration and smaller in size than the conventional type that independently generates the voltages. As a result, the power supply apparatus can be reduced in size and cost, and hence, the apparatus employing such a power supply apparatus can as a whole be reduced in size and cost.

Many widely deferent embodiments of the invention may be constructed without departing from the spirit and the scope of the present invention. It should be understood that the present invention is not limited to the specific embodiments described in the specification, except as defined in the appended claims.

What is claimed is:

1. An ultrasonic diagnostic apparatus having power supply means comprising: bias power supply means for generating a bias voltage; and driving power supply means, wherein the bias voltage is supplied to said driving power supply means, and said driving power supply means generates a driving voltage based upon the bias voltage.

2. The ultrasonic diagnostic apparatus according to claim 1, wherein the voltages generated by said power supply means and said driving power supply means are variable.

3. The ultrasonic diagnostic apparatus according to claim 1, wherein said driving power supply means include a linear power supply.

4. The ultrasonic diagnostic apparatus according to claim 1, wherein an amplitude of the bias voltage is controlled by a predetermined voltage signal.

5. The ultrasonic diagnostic apparatus according to claim 1, wherein an amplitude of the driving voltage is controlled by a predetermined voltage signal.

6. The ultrasonic diagnostic apparatus according to claim 1, wherein an alternating current is supplied to said bias power supply means to generate the bias voltage.

7. A power supply apparatus for supplying first operating means operated by a first voltage with the first voltage, and supplying second operating means operated by a second voltage lower than the first voltage with the second voltage, comprising: first power supply means for generating said first voltage; and second power supply means, wherein the first voltage is supplied to said second power supply means, and said second power supply means generates a second voltage based upon the first voltage.

8. The power supply apparatus according to claim 7, wherein the voltages generated by said first power supply means and said second power supply means are variable.

9. The power supply apparatus according to claim 7, wherein said second power supply means include a linear power supply.

10. The power supply apparatus according to claim 7, wherein an amplitude of the first voltage is controlled by a predetermined voltage signal.

11. The power supply apparatus according to claim 7, wherein an amplitude of the second voltage is controlled by a predetermined voltage signal.

12. The power supply apparatus according to claim 7, wherein an alternating current is supplied to said first power supply means to generate the first voltage.

13. An ultrasonic diagnostic apparatus comprising a power supply comprising:
  a bias power supply for generating a bias voltage; and
  a driving power supply, wherein the bias voltage is supplied to said driving power supply, and said driving power supply generates a driving voltage based upon the bias voltage.

14. An ultrasonic diagnostic apparatus in accordance with claim 13 wherein said bias power supply and said driving power supply are variable.

15. An ultrasonic diagnostic apparatus in accordance with claim 13 wherein said driving power supply comprises a linear power supply.

16. An ultrasonic diagnostic apparatus in accordance with claim 13 wherein an amplitude of the bias voltage is controlled by a predetermined voltage signal.

17. An ultrasonic diagnostic apparatus in accordance with claim 13 wherein an amplitude of the driving voltage is controlled by a predetermined voltage signal.

18. An ultrasonic diagnostic apparatus in accordance with claim 13 wherein an alternating current is supplied to said bias power supply to generate the bias voltage.

19. A method for operating an ultrasonic probe; said method comprising:

generating a bias voltage using a bias power supply;

directly supplying the bias voltage to a driving power supply;

generating a driving voltage from the bias voltage; and operating the ultrasonic probe using the driving voltage.

20. A method for generating an ultrasonic probe driving voltage in accordance with claim 19 wherein said generating a bias voltage using the bias power supply comprises generating a variable bias voltage using the bias power supply.

21. A method for generating an ultrasonic probe driving voltage in accordance with claim 19 wherein said generating a driving voltage using the driving power supply comprises generating a variable driving voltage using the driving power supply.

22. A method for generating an ultrasonic probe driving voltage in accordance with claim 19 wherein said generating a driving voltage using the driving power supply comprises generating a driving voltage using a linear power supply.

23. A method for generating an ultrasonic probe driving voltage in accordance with claim 19 further comprising controlling an amplitude of the bias voltage by applying a predetermined voltage signal to the bias power supply.

24. A method for generating an ultrasonic probe driving voltage in accordance with claim 19 further comprising controlling an amplitude of the driving voltage by applying a predetermined voltage signal to the driving power supply.

25. A method for generating an ultrasonic probe driving voltage in accordance with claim 19 further comprising:

providing an alternating current to the bias power supply; and generating the bias voltage from the alternating current.

* * * * *